United States Patent
Chmiel et al.

(10) Patent No.: US 9,053,443 B2
(45) Date of Patent: *Jun. 9, 2015

(54) ADAPTIVE CUSTOMIZED PRESENTATION OF BUSINESS INTELLIGENCE INFORMATION

(75) Inventors: Matthew S. Chmiel, Ottawa (CA);
Jason Hiltz-Laforge, Ottawa (CA);
Alireza Pourshahid, Ottawa (CA);
Graham A. Watts, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 56 days.

This patent is subject to a terminal disclaimer.

(21) Appl. No.: 13/545,724

(22) Filed: Jul. 10, 2012

(65) Prior Publication Data
US 2013/0173507 A1    Jul. 4, 2013

Related U.S. Application Data

(63) Continuation of application No. 13/341,644, filed on Dec. 30, 2011.

(51) Int. Cl.
*G06F 17/30* (2006.01)
*G06Q 10/06* (2012.01)

(52) U.S. Cl.
CPC ..................... *G06Q 10/06* (2013.01)

(58) Field of Classification Search
CPC .................. G06F 17/30867; G06F 17/3053
USPC .................................................. 707/765, 748
See application file for complete search history.

(56) References Cited

U.S. PATENT DOCUMENTS

| | | | |
|---|---|---|---|
| 7,668,860 B2 | 2/2010 | Naibo et al. | |
| 7,870,016 B2 | 1/2011 | Fazal et al. | |
| 7,996,466 B2 * | 8/2011 | Wu et al. | 709/204 |
| 8,126,887 B2 * | 2/2012 | Polo-Malouvier et al. | 707/729 |
| 2005/0114308 A1 | 5/2005 | Hyland et al. | |
| 2005/0154779 A1 * | 7/2005 | Cypher et al. | 709/202 |
| 2006/0010102 A1 * | 1/2006 | Labossiere et al. | 707/3 |
| 2007/0038683 A1 | 2/2007 | Dixon et al. | |

(Continued)

FOREIGN PATENT DOCUMENTS

WO     2008121350 A2    10/2008

OTHER PUBLICATIONS

"Database Management System" McGraw-Hill Science & Technology Encyclopedia, available at http://www.answers.com/topic/database-management-system, accessed Aug. 25, 2011, 13 pgs.

(Continued)

*Primary Examiner* — Thanh-Ha Dang
(74) *Attorney, Agent, or Firm* — Shumaker & Sieffert, P.A.

(57) ABSTRACT

In one example, a method includes receiving information on a user role of a user account associated with a business intelligence system. The method further includes gathering information on interactions of the user account with the business intelligence system. The method further includes generating an initial business intelligence output based on data from one or more data sources. The method further includes generating a customized business intelligence output for the user account based on the initial business intelligence output, the user role, and the interactions of the user account with the business intelligence system. The method further includes providing the customized business intelligence output to the user account.

13 Claims, 4 Drawing Sheets

(56) References Cited

U.S. PATENT DOCUMENTS

| | | | |
|---|---|---|---|
| 2007/0129953 A1* | 6/2007 | Cunningham et al. | 705/1 |
| 2007/0136364 A1 | 6/2007 | Mejia et al. | |
| 2007/0239508 A1* | 10/2007 | Fazal et al. | 705/8 |
| 2007/0266105 A1* | 11/2007 | Wu et al. | 709/206 |
| 2008/0082495 A1* | 4/2008 | Polo-Malouvier et al. | 707/3 |
| 2009/0006411 A1* | 1/2009 | Lele et al. | 707/9 |
| 2009/0076865 A1 | 3/2009 | Rousselle et al. | |
| 2009/0172024 A1* | 7/2009 | Hsu et al. | 707/104.1 |
| 2009/0248481 A1* | 10/2009 | Dick et al. | 705/9 |
| 2009/0300000 A1* | 12/2009 | Mackintosh et al. | 707/5 |
| 2009/0300544 A1 | 12/2009 | Psenka et al. | |
| 2009/0313568 A1* | 12/2009 | MacKintosh et al. | 715/769 |
| 2010/0121684 A1* | 5/2010 | Morio et al. | 705/10 |
| 2010/0161344 A1 | 6/2010 | Dyson | |
| 2011/0106829 A1* | 5/2011 | Pradhan et al. | 707/765 |
| 2011/0154209 A1* | 6/2011 | Fan et al. | 715/736 |
| 2011/0205231 A1* | 8/2011 | Hartley et al. | 345/440 |
| 2011/0231385 A1* | 9/2011 | Wang et al. | 707/709 |
| 2011/0320395 A1* | 12/2011 | Dada et al. | 706/47 |
| 2012/0089562 A1* | 4/2012 | Deremigio et al. | 707/602 |
| 2012/0215588 A1* | 8/2012 | Narvaez et al. | 705/7.33 |
| 2012/0259891 A1* | 10/2012 | Edoja | 707/784 |
| 2012/0330853 A1* | 12/2012 | Forbes et al. | 705/319 |
| 2013/0282693 A1* | 10/2013 | Wang et al. | 707/710 |

OTHER PUBLICATIONS

Grigori et al. "Business Process Intelligence" Computers in Industry, vol. 53, Issue 3, Apr. 2004. pp. 321-343.

Baars et al. "Management Support with Structured and Unstructured Data—An Integrated Business Intelligence Framework", Information Systems Management, 25: 132-148, Taylor & Francis Group, LLC, Apr. 7, 2008.

Office Action from U.S. Appl. No. 13/341,644 dated Apr. 11, 2013 (15 pages).

Amendment from U.S. Appl. No. 13/341,644, filed Jul. 11, 2013 (12 pages).

International Search Report mailed Apr. 3, 2013 in corresponding PCT Application No. PCT/CA2012/050910, 3 pgs.

Final Office Action mailed Oct. 25, 2013 in U.S. Appl. No. 13/341,644, 18 pgs.

Response filed Jan. 28, 2014 to the Final Office Action mailed Oct. 25, 2013 in U.S. Appl. No. 13/341,644, 12 pgs.

Office Action from U.S. Appl. No. 13/341,644, dated Sep. 11, 2014, 20 pp.

Amendment in Response to Office Action mailed Sep. 11, 2014, from U.S. Appl. No. 13/341,644, filed Dec. 15, 2014, 13 pp.

* cited by examiner

ADAPTIVE CUSTOMIZED PRESENTATION OF BUSINESS INTELLIGENCE INFORMATION

This application is a continuation of Ser. No. 13/341,644, filed on Dec. 30, 2011, entitled ADAPTIVE CUSTOMIZED PRESENTATION OF BUSINESS INTELLIGENCE INFORMATION, the entire content of which is incorporated herein by reference.

TECHNICAL FIELD

The invention relates to business intelligence systems, and more particularly, to providing business intelligence reports, analyses, and dashboards for business intelligence system users.

BACKGROUND

Enterprise software systems are typically sophisticated, large-scale systems that support many, e.g., hundreds or thousands, of concurrent users. Examples of enterprise software systems include financial planning systems, budget planning systems, order management systems, inventory management systems, sales force management systems, business intelligence tools, enterprise reporting tools, project and resource management systems, and other enterprise software systems.

Many enterprise performance management and business planning applications require a large base of users to enter data that the software then accumulates into higher level areas of responsibility in the organization. Moreover, once data has been entered, it must be retrieved to be utilized. The system may perform mathematical calculations on the data, combining data submitted by many users. Using the results of these calculations, the system may generate reports for review by higher management. Often these complex systems make use of multidimensional data sources that organize and manipulate the tremendous volume of data using data structures referred to as data cubes. Each data cube, for example, includes a plurality of hierarchical dimensions having levels and members for storing the multidimensional data.

Reporting and analysis end user products (typically referred to as Business Intelligence, or BI, tools) allow users to author reports and perform data exploration and analysis on a myriad of data sources, such as multi-dimensional data structures, relational databases, flat files, Extensible Markup Language ("XML") data, data streams, and unorganized text and data. BI tools may be used to prepare and aggregate individual reports and analyses by executing queries on underlying data sources, and to present those reports and analyses to a user-accessible format such as BI reports, analyses, and dashboards.

SUMMARY

In general, examples disclosed herein are directed to a business intelligence (BI) system with context-sensitive and adaptive presentation of BI information, such as reports, analyses, and dashboards.

In one example, a method includes receiving information on a user role of a user account associated with a business intelligence system. The method further includes gathering information on interactions of the user account with the business intelligence system. The method further includes generating an initial business intelligence output based on data from one or more data sources. The method further includes generating a customized business intelligence output for the user account based on the initial business intelligence output, the user role, and the interactions of the user account with the business intelligence system. The method further includes providing the customized business intelligence output to the user account.

In another embodiment, a computing system includes one or more processors; one or more computer-readable data storage devices; and an enterprise software application, stored on the one or more computer-readable data storage devices for execution by the one or more processors, and configured for customizing a business intelligence output for a user account. The enterprise software application includes program instructions for receiving information on a user role of a user account associated with a business intelligence system. The enterprise software application further includes program instructions for gathering information on interactions of the user account with the business intelligence system. The enterprise software application further includes program instructions for generating an initial business intelligence output based on data from one or more data sources. The enterprise software application further includes program instructions for generating a customized business intelligence output for the user account based on the initial business intelligence output, the user role, and the interactions of the user account with the business intelligence system. The enterprise software application further includes program instructions for providing the customized business intelligence output to the user account.

In another embodiment, a computer-readable storage medium includes executable instructions stored on a non-transitory computer-readable storage medium. The executable instructions are configured for causing one or more programmable processors to receive information on a user role of a user account associated with a business intelligence system. The executable instructions are further configured for causing one or more programmable processors to gather information on interactions of the user account with the business intelligence system. The executable instructions are further configured for causing one or more programmable processors to generate an initial business intelligence output based on data from one or more data sources. The executable instructions are further configured for causing one or more programmable processors to generate a customized business intelligence output for the user account based on the initial business intelligence output, the user role, and the interactions of the user account with the business intelligence system. The executable instructions are further configured for causing one or more programmable processors to provide the customized business intelligence output to the user account.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
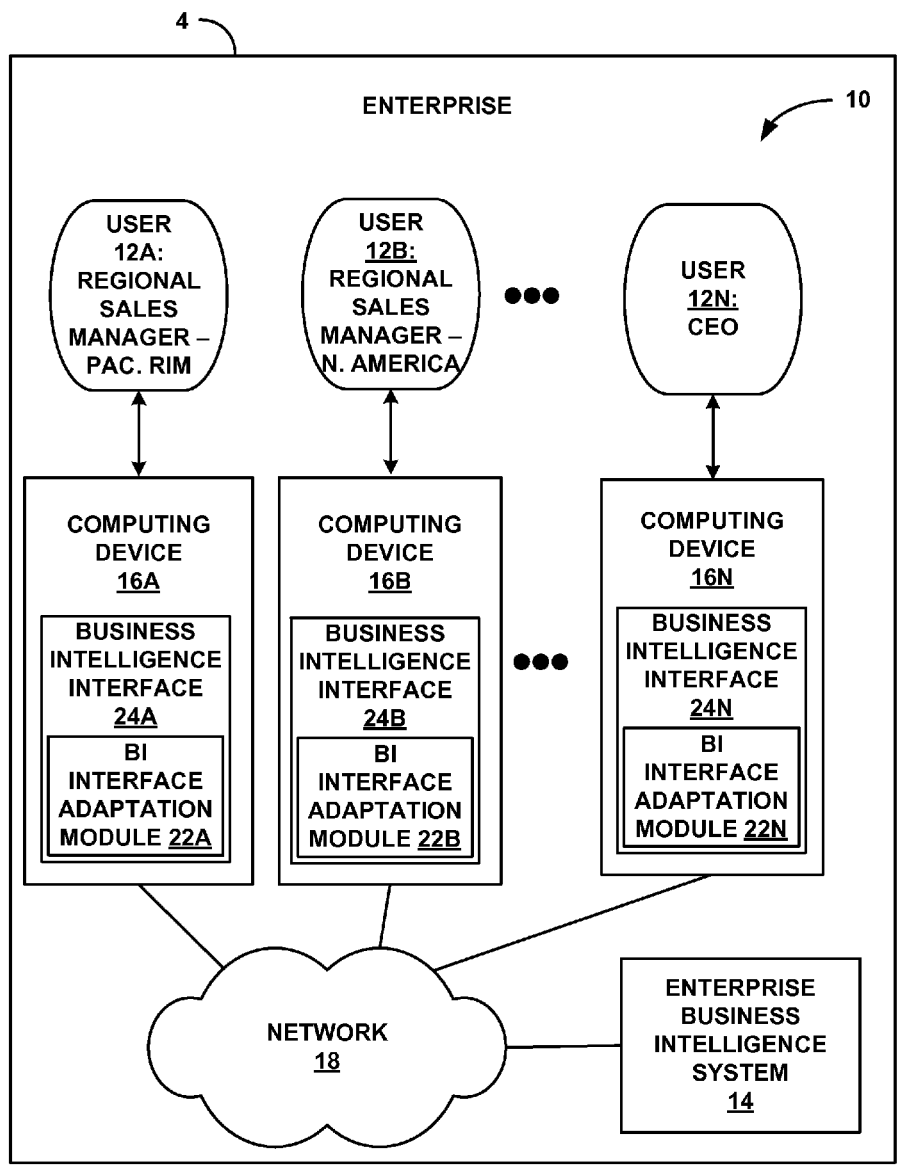
FIG. 1 is a block diagram illustrating an example enterprise having a computing environment in which multiple users with various roles in the enterprise interact with an enterprise business intelligence system over a network, using computing devices with adaptive business intelligence (BI) interfaces.

FIG. 1 illustrates an example context in which techniques disclosed herein may be used. FIG. 1 is a block diagram illustrating an example enterprise 4 having a computing environment 10 in which a plurality of users 12A-12N (collectively, "users 12") may interact with an enterprise business intelligence system 14. In the system shown in FIG. 1, enterprise business intelligence system 14 is communicatively coupled to a number of computing devices 16A-16N (collectively, "computing devices 16") by an enterprise network 18. Users 12 interact with their respective computing devices to access enterprise business intelligence system 14. Users 12, computing devices 16A-16N, enterprise network 18, and enterprise business intelligence system 14 may all be either in a single facility or widely dispersed in two or more separate locations anywhere in the world, in different examples.

For exemplary purposes, various examples of the techniques of this disclosure may be readily applied to various software systems, including enterprise business intelligence systems or other large-scale enterprise software systems. Examples of enterprise software systems include enterprise financial or budget planning systems, order management systems, inventory management systems, sales force management systems, business intelligence tools, enterprise reporting tools, project and resource management systems, and other enterprise software systems.

Typically, users 12 may use a user-configurable business intelligence (BI) dashboard to view and manipulate data via their respective computing devices 16. This may include data from any of a wide variety of sources, including from multidimensional data structures and relational databases within enterprise 4. Multidimensional data structures are "multidimensional" in that each multidimensional data element is defined by a plurality of different object types, where each object is associated with a different dimension. Users 12 may, for example, retrieve data related to store sales by entering a name of a sales person, a store identifier, a date, a product, and a price at which the product was sold, into their respective computing devices 16.

Enterprise users 12 may use a variety of different types of computing devices 16 to run a business intelligence dashboard and to interact with enterprise business intelligence system 14 via enterprise network 18. For example, an enterprise user 12 may run a business intelligence interface and interact with enterprise business intelligence system 14 using a laptop computer, desktop computer, or the like, running a web browser, such as Internet Explorer™ from Microsoft Corporation of Redmond, Wash. Alternatively, an enterprise user may use a smartphone or similar device, running a business intelligence dashboard in either a web browser or a dedicated smartphone application for interacting with enterprise business intelligence system 14. In either case, a business intelligence interface running on a user's computing device 16 may access various data sources from within enterprise business intelligence system 14.

Enterprise network 18 may represent any communication network, such as a packet-based digital network like a private enterprise intranet. In this manner, computing environment 10 can readily scale to suit large enterprises. Enterprise users 12 may directly access enterprise business intelligence system 14 via a local area network, or may remotely access enterprise business intelligence system 14 via a virtual private network, remote dial-up, or similar remote access communication mechanism.

Figure 2:
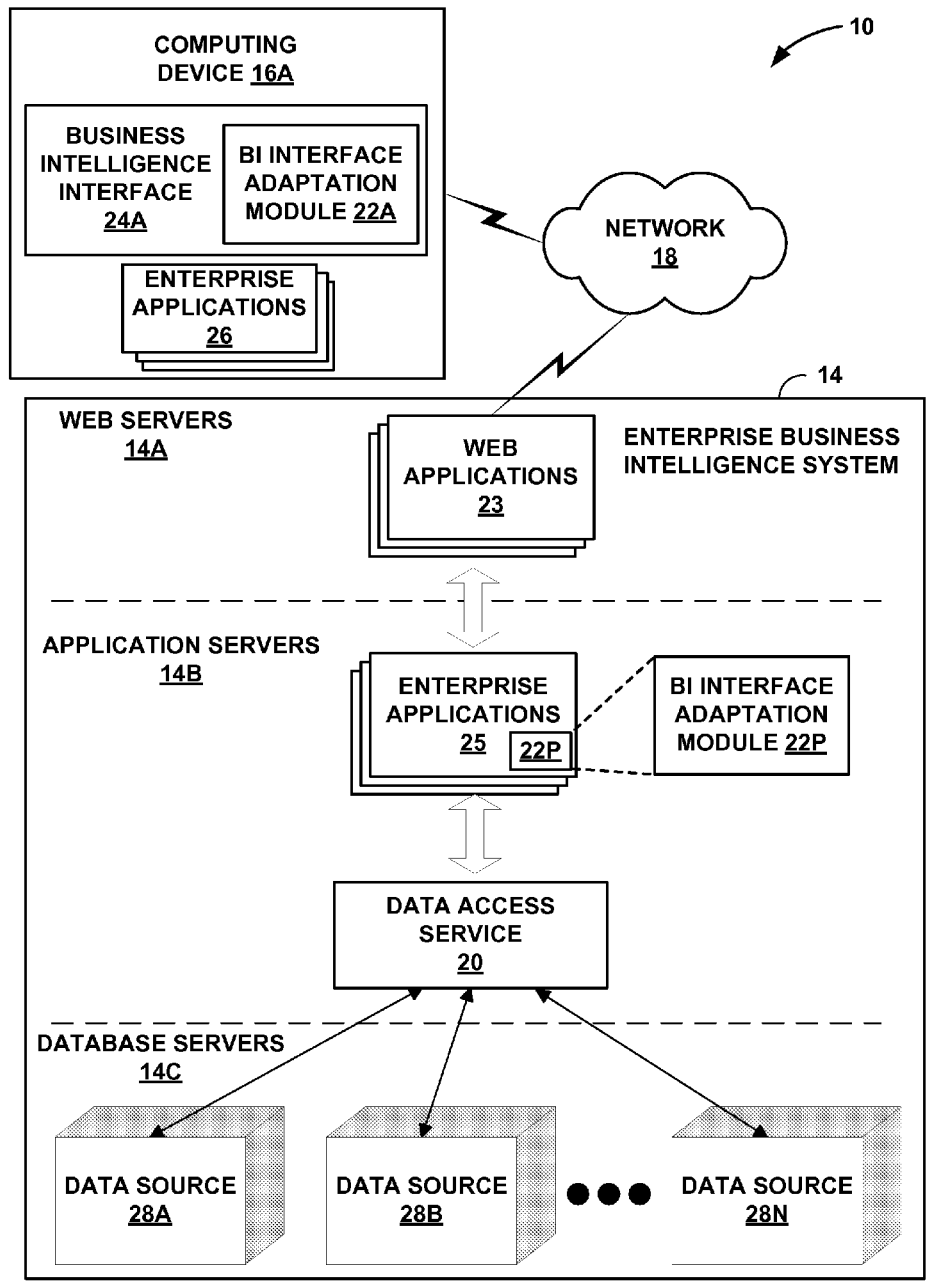
FIG. 2 is a block diagram illustrating one embodiment of a computing device running a business intelligence (BI) system that includes a business intelligence interface adaptation module, that provides information from an enterprise business intelligence system that makes use of a plurality of data sources.

FIG. 2 is a block diagram illustrating in further detail portions of one embodiment of a computing environment 10 comprising an enterprise business intelligence (BI) system 14. In this example implementation, a single client computing device 16A is shown for purposes of example and includes a BI interface 24A that includes a BI interface adaptation module 22A that can be used to gather information on BI contexts and user interactions with the BI system and to provide context-sensitive and adaptive presentation of BI information, such as reports, analyses, and dashboards. Computing device 16A may include one or more client-side enterprise software applications 26 that utilize and manipulate BI information that includes multidimensional data. BI interface 24A (or the client side of BI interface 24A) may be rendered within a general web browser application, within a locally hosted application or mobile application, or other user interface.

BI interface adaptation module 22A may be included as part of the software of BI interface 24A, and while it is termed a "module" as a catch-all, generic term herein, BI interface adaptation module 22A may include any one or more modules, processes, software objects, subroutines, plug-ins, add-ons, data structures, or other portions of executable code or associated data structures of any one or more software programs. This may include any combination of client-side application software and data local to computing device 16A, or remotely hosted on the server side in one or more web servers 14A, application servers 14B, or other remote resources. BI interface adaptation module 22A may also be or include one or more software applications that are separate from BI interface 24A and that interact with or provide information to BI interface 24A, in various embodiments. For example, a BI interface adaptation module 22P may be included as part of enterprise applications 25 running on the server side in application servers 14B comprised in BI system 14. All or any part of the functions of receiving information on user roles, analyzing user interactions with the BI system, and customizing BI outputs based on the user role and user interactions may be performed by either BI interface adaptation module 22A on the client side, or BI interface adaptation module 22P on the server side, in different implementations.

FIG. 2 depicts additional detail for enterprise business intelligence system 14 and how it may be used to generate reports that may then be available to BI interface adaptation modules 22P and/or 22A for generating a customized business intelligence output for the user account associated with BI interface 24A running on computing device 16A. As depicted in FIG. 2, enterprise business intelligence system 14 is implemented in accordance with a three-tier architecture: (1) one or more web servers 14A that provide web applications 23 with user interface functions; (2) one or more application servers 14B that provide an operating environment for enterprise software applications 25 and a data access service 20; and (3) database servers 14C that provide one or more data sources 28A-28N.

The data sources 28A-28N may include two-dimensional databases and/or multidimensional databases, i.e. cubes. The data sources may be implemented using a variety of vendor platforms, and may be distributed throughout the enterprise.

As one example, the data sources 28A-28N may include multidimensional databases configured for Online Analytical Processing (OLAP). As another example, the data sources 28A-28N may include multidimensional databases configured to receive and execute Multidimensional Expression (MDX) queries of some arbitrary level of complexity. As yet another example, the data sources 28A-28N may include two-dimensional relational databases configured to receive and execute SQL queries, also with an arbitrary level of complexity.

The enterprise applications 26 on computing device 16A may issue business queries to enterprise business intelligence system 14 to build reports. Enterprise business intelligence system 14 includes a data access service 20 that provides a logical interface to the data sources 28A-28N. Computing device 16A may transmit query requests through enterprise network 18 to data access service 20. Data access service 20 may, for example, execute on the application servers intermediate to the enterprise applications 25 and the underlying data sources 28A-28N. Data access service 20 retrieves a query result set from the underlying data sources, in accordance with query specifications. Data access service 20 intercepts or receives queries, e.g., by way of an API presented to enterprise applications 25. Data access service 20 may then return this result set to enterprise applications 25, 26 as BI reports that are made available to BI dashboard assembly tool 22 on computing device 16A.

Large amounts of corporate data are made available to information workers within an organization. In many cases, the amount of data may be overwhelming and the organization of it does not facilitate the user discovering the data most appropriate for their needs. The level of data may be stored in various dimensions in a multidimensional data cube. For example, region, country, state/province, and city levels of detail may make up a geography dimension, whereas product line, product type, brand, and SKU number data may make up a different dimension, a product dimension.

Members of an organization typically consume information at a level of abstraction proportional to their position in the organization hierarchy. For example, a CEO of a company, at the top of the organizational hierarchy, might be most interested in revenue data at the highest level, such as by major geographical regions (e.g. Asia-Pacific, North America, South America, Europe) or at the country level. Executives for the individual regions or countries might be most interested in a breakdown of revenue at the next level of detail, e.g., state/province, county, or city, and so on down the organizational hierarchy.

BI methods, systems, and products as disclosed herein are able to guide users to data that is focused and at a level of abstraction appropriate to each user's information consumption needs, and enable users to more easily consume or discover corporate data at an appropriate level of abstraction related to their position in the organizational hierarchy. A BI method, system, or product (which may all generically be referred to as a BI system) tracks the association of levels of data detail in the BI system to a specific user, user account, user group, or user role (which may all generically be referred to as a user or a user account). Doing so allows the BI system to surface information at a level likely to be of highest interest to a user. It also improves data discovery, as associations between user and data can be shared between users in a group, as well as usability and relevance of the data presented.

A BI system may carry out two ongoing groups of tasks, one centered around the processes of gathering information to associate data levels to particular users, and the other centered around using the information and associations from the gathering process in customizing how the system delivers BI data to those particular users, such as in a user-facing BI interface.

For the information gathering component, the BI system may receive information on user roles of various user accounts associated with the BI system, and gather information on interactions of the user accounts with the BI system. Each user account may correspond with a particular user, who may log into or interact with the BI system from one or more computing devices. The user accounts may each be identified with a user role in the enterprise, such as CEO, senior vice president for sales and marketing, or regional sales manager for the western U.S., Canada, or Brazil, for example. The BI system may receive information on the user role from data about the user account and/or data about the enterprise, such as a database or data model, for example.

The BI system may use various means to gather additional data that may be useful for customizing data presentations, including mining, monitoring, and recording associations between users and levels of data abstraction. For example, the BI system may mine existing BI system outputs or artifacts and determine their intended or actual audience or users. BI system outputs may collectively refer to any of a variety of presentations of information or interfaces for exploring information, such as BI reports, BI analyses, and BI dashboards. The BI system may determine the intended audience for a BI output by identifying recipients, such as those users to whom the BI output is emailed. The BI system may determine actual audience by identifying which users view or execute the BI output. The BI system may record associations between a user and the level of abstraction of data in the BI outputs as sent to that user or as that user actually interacts with the BI outputs.

The BI system may also mine data about a user or user account that can be associated with other data in the BI system. For example, for a user account for a user who has an executive-level title and is located in Brazil, the BI system may create a primary association of the user account to the Country level or to the State level in the Geography dimension.

The BI system may also monitor a user's interaction with BI outputs, and inspect the level of data detail the user interacts with in the BI outputs, and create associations between the user account and the levels of detail of the user interactions over time. The BI system may record associations for one user account with multiple dimensions, along with different weightings or rankings of the associations with different dimensions, instead of only one association with one dimension. These are illustrated in Tables 1-3 below.

The BI system may also monitor a user's interactions with the data in the BI system, as well as the user's interactions with BI outputs produced by or associated with the BI system. If a user leverages BI authoring or analysis tools that involve direct interactions with the data in the BI system, the BI system may create associations between the user account and the level of detail the user interacts with through the authoring or analysis tools. The BI system may also monitor a user's interaction with hierarchical filters or slicer controls among the BI tools, and create an association between the user account and the level of detail the user invokes using the hierarchical filters or slicer controls.

The BI system may also enable the associations between user accounts and dimensional levels of detail to be manually set or modified in a database or data model. This manual entry or modification may be restricted to certain user accounts with appropriate permission.

Examples of user accounts with multiple associations stored for different levels of detail in multiple dimensions are illustrated in Tables 1-3 below, one table for each of three different types of user accounts. These tables represent how a BI interface adaptation module of a BI system stores the weightings of various users' associations to particular levels of detail in various dimensions, at a particular point in time, as may be determined by the BI interface adaptation module based on any one or more of the various methods discussed above.

TABLE 1

| User | Data source | Dimension | Level | Weighting |
|---|---|---|---|---|
| CEO | Sales | Geography | All Geographies | 50% |
| CEO | Sales | Geography | Region | 35% |
| CEO | Sales | Geography | Country | 15% |
| CEO | Sales | Geography | State/Province | 0% |
| CEO | Sales | Geography | City | 0% |
| CEO | Sales | Products | All Products | 50% |
| CEO | Sales | Products | Product Line | 25% |
| CEO | Sales | Products | Product Type | 25% |
| CEO | Sales | Products | Brand | 0% |
| CEO | Sales | Products | SKU | 0% |

TABLE 2

| User | Data source | Dimension | Level | Weighting |
|---|---|---|---|---|
| S.V.P. | Sales | Geography | All Geographies | 35% |
| S.V.P. | Sales | Geography | Region | 50% |
| S.V.P. | Sales | Geography | Country | 15% |
| S.V.P. | Sales | Geography | State/Province | 0% |
| S.V.P. | Sales | Geography | City | 0% |
| S.V.P. | Sales | Products | All Products | 25% |
| S.V.P. | Sales | Products | Product Line | 50% |
| S.V.P. | Sales | Products | Product Type | 25% |
| S.V.P. | Sales | Products | Brand | 0% |
| S.V.P. | Sales | Products | SKU | 0% |

TABLE 3

| User | Data source | Dimension | Level | Weighting |
|---|---|---|---|---|
| Regional Sales Mgr. | Sales | Geography | All Geographies | 5% |
| Regional Sales Mgr. | Sales | Geography | Region | 5% |
| Regional Sales Mgr. | Sales | Geography | Country | 20% |
| Regional Sales Mgr. | Sales | Geography | State/Province | 40% |
| Regional Sales Mgr. | Sales | Geography | City | 30% |
| Regional Sales Mgr. | Sales | Products | All Products | 10% |
| Regional Sales Mgr. | Sales | Products | Product Line | 20% |
| Regional Sales Mgr. | Sales | Products | Product Type | 30% |
| Regional Sales Mgr. | Sales | Products | Brand | 20% |
| Regional Sales Mgr. | Sales | Products | SKU | 20% |

Table 1 shows that the CEO is most interested in the Geography dimension at the All Geographies level of detail and in the Products dimension at the All Products level of detail; the senior vice president is most interested in the Geography dimension at the Region level of detail and in the Products dimension at the Product Line level of detail; and the regional sales manager is most interested in the Geography dimension at the State/Province level of detail and in the Products dimension at the Product Type level of detail. For roles such as senior vice president or regional sales manager, the BI system may create and maintain one table of associations for every user with that role as a group, or may create and maintain individual tables for different individual users with that role within the enterprise, to provide more individualized customization of aspects of the BI interface.

A set of weightings for each of the levels of detail may be useful for a number of purposes, as opposed to simply assigning one level of detail to each user role and not distinguishing among weightings for the remaining levels of detail. For example, the different weightings of the levels of detail outside of the level with the highest weight for the user may still be used in ranking, ordering, or emphasizing the additional levels of detail when or if the user interacts with the BI output beyond the initial or default views focused on the primary level for that user.

The BI system may also go beyond this, and modify the weightings for the different levels over time based on the user's interactions. If a user consistently spends a lot of time or interactions in a different level of detail than the highest-weighted level for that user, the BI system may adjust the relative weightings of the two levels until the point where that other level of detail becomes the highest-weighted one for that user. This may also include individual customization for a specific user within a user group or user role, so that different users with the same hierarchical rank or user role may have weightings individually customized for them based on their interactions with the BI system. For example, one senior vice president who spends a lot of interactions on lower levels of detail, such as the Product Type category in the Product dimension or the Country level in the Geography dimension, may have her weightings re-ordered so that those levels become the highest-weighted levels in those dimensions in her customization of subsequent BI outputs.

The BI system can use the associations gathered and stored for each user account, as illustrated in Tables 1-3, for a variety of customized BI outputs, such as reports, analyses, or dashboards, for user consumption or interactions with the BI system. This may include any type of BI report, analysis, dashboards, spreadsheet, data structure, database, flat file, Extensible Markup Language ("XML") data, data stream, or other type of file or resource that is outputted by the BI system and customized in some way based on information on the user's role and information on interactions of the user account (i.e., of the user) with the BI system. For example, the BI system may provide a user with a BI output highlight or otherwise visually indicate levels of data in a flat list or in a tree corresponding to the levels that have the highest weight within a dimension. In another example, the BI system may provide heat-map-style highlighting to show the weighted distribution across a dimension.

As a user views or interacts with BI outputs or artifacts, the BI system may suggest updating the content or data on the report or other BI output to reflect the level of aggregation that the user is most likely to be interested in, as reflected by the weightings in the table. For example, if a user with a regional sales manager role, as reflected in her user account, opens a report with a list showing Geography data by region, the BI interface adaptation module may automatically prompt the user to choose whether to update this report with State/Province level Geography data, since the detail level associations table for this user, Table 3, indicates the State/Province level to have the highest association for this user in the Geography dimension, with a 40% weighting.

The BI interface adaptation module may also automatically adjust report data filter prompts to the level most likely of interest to an individual user. For example, if a senior vice president runs a BI report that initially has a data filter prompt on the Product Brand level, the BI interface adaptation module may automatically change the data filter prompt to the Product Line level, where Table 2 indicates that a senior vice president user account has a 50% weighting for the Product Line level. Or, rather than automatically changing the data filter prompt, the BI system may automatically present a user option to change the data filter prompt toward the highest weighted detail level for that user. Instead of arbitrarily choosing a default data view, the BI system may use the level of detail with the highest weighting or indicated to have the most interest to a particular user as a starting point in the BI tools that present users with a default view of data.

The BI interface adaptation module may also use the user-customized detail level weightings as input to a search of BI content, to tailor the results of the search for a particular user. For example, it may use the user's weightings to filter or modify the ranking of search results, to provide higher rankings or emphasis on search results that more closely match the user's detail level weightings. For instance, if a senior vice president searches for a sales report, the BI system may return search results that weight or rank reports at the Region level of detail in the Geography dimension higher than those at the City level of the Geography dimension.

The BI interface adaptation module may also use the user-customized detail level weightings as input to bursted distribution of BI outputs or artifacts, such as a BI report that is generated and then automatically emailed to a set of users. For example, a report author may create a report to be emailed to all users in three different hierarchical user groups of an enterprise, such as the CEO, other senior executives such as senior vice presidents, and regional sales managers. The BI system may receive the BI report spec from the author, execute the report spec on various data sources, generate the BI report, and then email different versions of the BI report to each of the three different user groups, where each version focuses on or emphasizes the level of detail with the highest weighting for that user group. So, the BI system may prepare and email a CEO version of the BI report to the CEO, focusing on the most macroscopic level of detail; a senior executive version of the BI report to senior vice presidents, focusing on an intermediate level of detail; and a regional sales manager version of the BI report to the regional sales managers, that focuses on a smaller-scale level of detail.

The BI interface adaptation module may also use the user-customized detail level weightings to automatically generate BI outputs or artifacts to be pushed up or down the enterprise hierarchy. For example, if a user in the middle of the enterprise hierarchy creates a BI output and sends the BI output to other users including some who are higher up in the enterprise hierarchy and some who are lower down in the hierarchy, the BI interface adaptation module may adapt the level of detail in the BI output to be abstracted into a more generalized presentation for those users who are higher on the hierarchy, and broken down into smaller-scale levels of detail for those users who are lower on the hierarchy.

Figure 3:
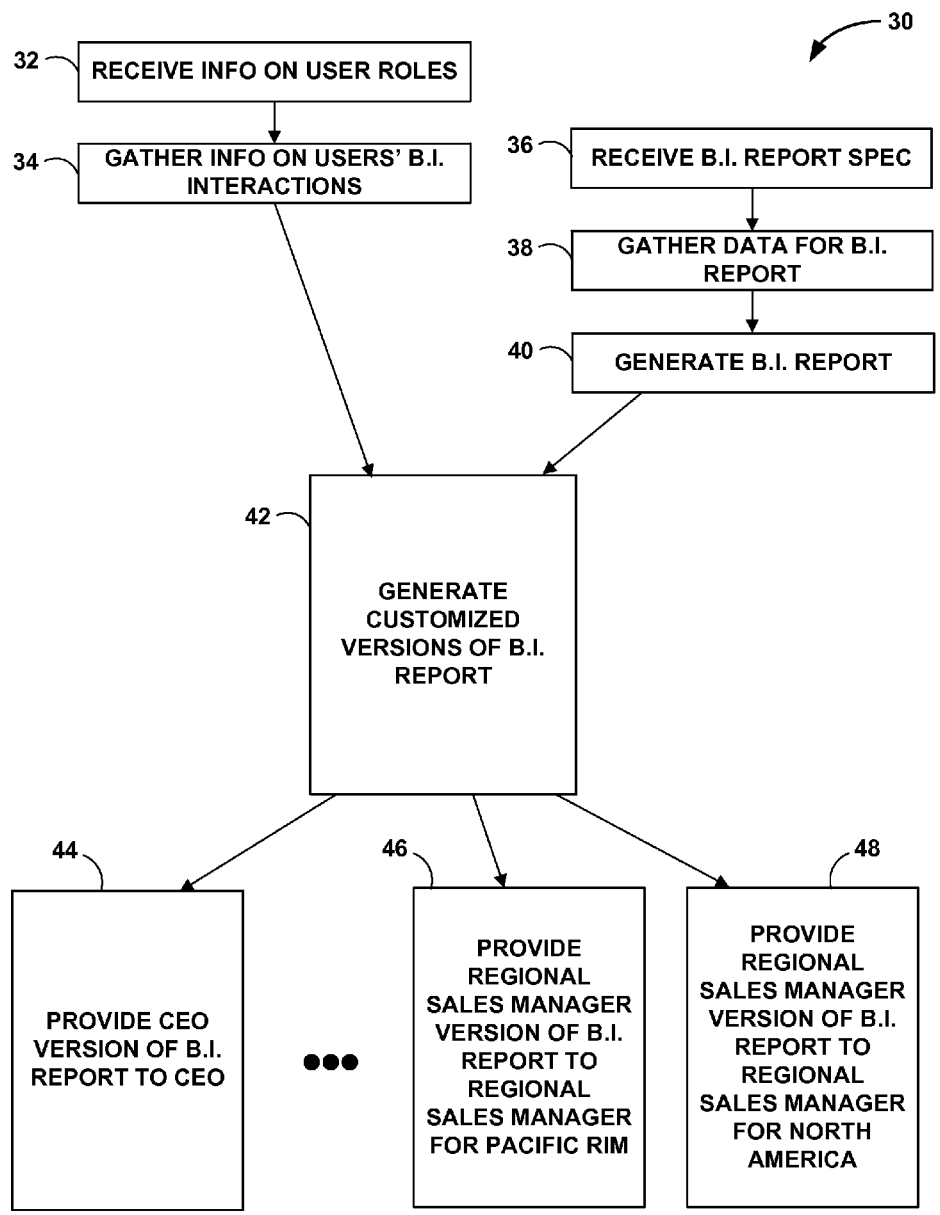
FIG. 3 is a flowchart illustrating example operation of a business intelligence (BI) system that includes a business intelligence interface adaptation module.
Figure 4:
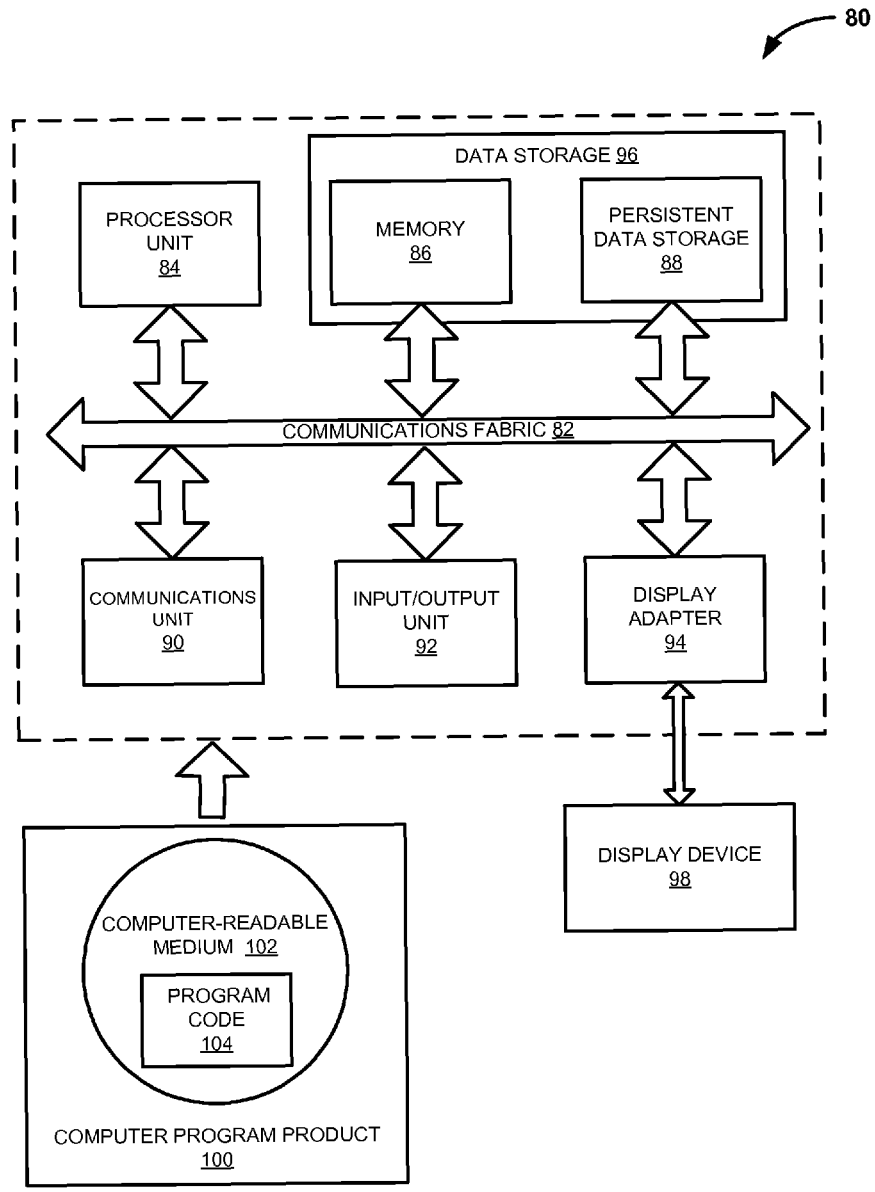
FIG. 4 is a block diagram of a computing device that may run a BI system with a business intelligence interface adaptation module.

FIG. 3 is a flowchart illustrating an example process 30 that may be performed by a BI system that includes a BI interface adaptation module or equivalent tool or portions of software. Although described in reference to enterprise business intelligence system 14 of FIGS. 1 and 2 and BI interface adaptation modules 22A, 22P as depicted in FIG. 2, the principles of the disclosure are not limited to the described embodiments and may be applied to any BI system that is capable of searching data sources and producing or configuring BI outputs such as reports, analysis, and dashboards.

As shown in the example of FIG. 3, a BI system receives info on user roles (32) and gathers info on users' BI interactions (34). The BI system receives a BI report spec (36), which may be authored by one of the users. The BI system executes the report spec and gathers data from one or more data sources in accordance with the report spec (38), and generates an initial BI report based on the data (40). The BI system then generates customized BI reports, each one being a customized version of the initial BI report, for each of one or more user accounts, based on both the initial BI report and the user role and interactions of each of the user accounts (42). Various examples are shown, including providing a CEO version of the BI report to the CEO's user account (44), and providing regional sales manager versions of the BI report to regional sales managers (or to their user accounts) for a Pacific Rim region and a North America region (46, 48). Providing the customized BI reports to the given users, through their user accounts, may take the form of emailing the customized BI reports to their email address, or adding the customized BI reports to the users' BI dashboards, for example.

The techniques described herein make reference to business intelligence reports generated with the MDX query language and the SQL query language, as illustrative examples of a multidimensional data query language and a relational database query language, respectively. However, the techniques described herein may be applied to reports generated with any other structured language or tool capable of querying any type of data structures, or with any type of query result set or any other type of data.

FIG. 8 is a block diagram of a computing device 80 that may be used to run a BI interface with a BI interface adaptation module, according to an illustrative example. Computing device 80 may be a workstation, server, mainframe computer, notebook or laptop computer, desktop computer, tablet, smartphone, feature phone, or other programmable data processing apparatus of any kind. Other possibilities for computing device 80 are possible, including a computer having capabilities or formats other than or beyond those described herein.

In this illustrative example, computing device 80 includes communications fabric 82, which provides communications between processor unit 84, memory 86, persistent data storage 88, communications unit 90, and input/output (I/O) unit 92. Communications fabric 82 may include a dedicated system bus, a general system bus, multiple buses arranged in hierarchical form, any other type of bus, bus network, switch fabric, or other interconnection technology. Communications fabric 82 supports transfer of data, commands, and other information between various subsystems of computing device 80.

Processor unit 84 may be a programmable central processing unit (CPU) configured for executing programmed instructions stored in memory 86. In another illustrative example, processor unit 84 may be implemented using one or more heterogeneous processor systems in which a main processor is present with secondary processors on a single chip. In yet another illustrative example, processor unit 84 may be a symmetric multi-processor system containing multiple processors of the same type. Processor unit 84 may be a reduced instruction set computing (RISC) microprocessor such as a PowerPC® processor from IBM® Corporation, an x86 compatible processor such as a Pentium® processor from Intel® Corporation, an Athlon® processor from Advanced Micro Devices® Corporation, or any other suitable processor. In various examples, processor unit 84 may include a multi-core processor, such as a dual core or quad core processor, for example. Processor unit 84 may include multiple processing chips on one die, and/or multiple dies on one package or substrate, for example. Processor unit 84 may also include one or more levels of integrated cache memory, for example. In various examples, processor unit 84 may comprise one or more CPUs distributed across one or more locations.

Data storage 96 includes memory 86 and persistent data storage 88, which are in communication with processor unit 84 through communications fabric 82. Memory 86 can include a random access semiconductor memory (RAM) for storing application data, i.e., computer program data, for processing. While memory 86 is depicted conceptually as a single monolithic entity, in various examples, memory 86 may be arranged in a hierarchy of caches and in other memory devices, in a single physical location, or distributed across a plurality of physical systems in various forms. While memory 86 is depicted physically separated from processor unit 84 and other elements of computing device 80, memory 86 may refer equivalently to any intermediate or cache memory at any location throughout computing device 80, including cache memory proximate to or integrated with processor unit 84 or individual cores of processor unit 84.

Persistent data storage 88 may include one or more hard disc drives, solid state drives, flash drives, rewritable optical disc drives, magnetic tape drives, or any combination of these or other data storage media. Persistent data storage 88 may store computer-executable instructions or computer-readable program code for an operating system, application files comprising program code, data structures or data files, and any other type of data. These computer-executable instructions may be loaded from persistent data storage 88 into memory 86 to be read and executed by processor unit 84 or other processors. Data storage 96 may also include any other hardware elements capable of storing information, such as, for example and without limitation, data, program code in functional form, and/or other suitable information, either on a temporary basis and/or a permanent basis.

Persistent data storage 88 and memory 86 are examples of physical, tangible, non-transitory computer-readable data storage devices. Data storage 96 may include any of various forms of volatile memory that may require being periodically electrically refreshed to maintain data in memory, but those skilled in the art will recognize that this also constitutes an example of a physical, tangible, non-transitory computer-readable data storage device. Executable instructions are stored on a non-transitory medium when program code is loaded, stored, relayed, buffered, or cached on a non-transitory physical medium or device, including if only for only a short duration or only in a volatile memory format.

Processor unit 84 can also be suitably programmed to read, load, and execute computer-executable instructions or computer-readable program code for a BI interface adaptation module that may automatically customize or adapt BI outputs based on user role and usage history, as described in greater detail above. This program code may be stored on memory 86, persistent data storage 88, or elsewhere in computing device 80. This program code may also take the form of program code 104 stored on computer-readable medium 102 comprised in computer program product 100, and may be transferred or communicated, through any of a variety of local or remote means, from computer program product 100 to computing device 80 to be enabled to be executed by processor unit 84, as further explained below.

The operating system may provide functions such as device interface management, memory management, and multiple task management. The operating system can be a Unix based operating system such as the AIX® operating system from IBM® Corporation, a non-Unix based operating system such as the Windows® family of operating systems from Microsoft® Corporation, a network operating system such as JavaOS® from Oracle® Corporation, a mobile device operating system such as iOS® from Apple® Inc., or any other suitable operating system. Processor unit 84 can be suitably programmed to read, load, and execute instructions of the operating system.

Communications unit 90, in this example, provides for communications with other computing or communications systems or devices. Communications unit 90 may provide communications through the use of physical and/or wireless communications links. Communications unit 90 may include a network interface card for interfacing with a LAN 16, an Ethernet adapter, a Token Ring adapter, a modem for connecting to a transmission system such as a telephone line, or any other type of communication interface. Communications unit 90 can be used for operationally connecting many types of peripheral computing devices to computing device 80, such as printers, bus adapters, and other computers. Communications unit 90 may be implemented as an expansion card or be built into a motherboard, for example.

The input/output unit 92 can support devices suited for input and output of data with other devices that may be connected to computing device 80, such as keyboard, a mouse or other pointer, a touchscreen interface, an interface for a printer or any other peripheral device, a removable magnetic or optical disc drive (including CD-ROM, DVD-ROM, or Blu-Ray), a universal serial bus (USB) receptacle, or any other type of input and/or output device. Input/output unit 92 may also include any type of interface for video output in any type of video output protocol and any type of monitor or other video display technology, in various examples. It will be understood that some of these examples may overlap with each other, or with example components of communications unit 90 or data storage 96. Input/output unit 92 may also include appropriate device drivers for any type of external device, or such device drivers may reside elsewhere on computing device 80 as appropriate.

Computing device 80 also includes a display adapter 94 in this illustrative example, which provides one or more connections for one or more display devices, such as display device 98, which may include any of a variety of types of display devices. It will be understood that some of these examples may overlap with example components of communications unit 90 or input/output unit 92. Input/output unit 92 may also include appropriate device drivers for any type of external device, or such device drivers may reside elsewhere on computing device 80 as appropriate. Display adapter 94 may include one or more video cards, one or more graphics processing units (GPUs), one or more video-capable connection ports, or any other type of data connector capable of communicating video data, in various examples. Display device 98 may be any kind of video display device, such as a monitor, a television, or a projector, in various examples.

Input/output unit 92 may include a drive, socket, or outlet for receiving computer program product 100, which comprises a computer-readable medium 102 having computer program code 104 stored thereon. For example, computer program product 100 may be a CD-ROM, a DVD-ROM, a Blu-Ray disc, a magnetic disc, a USB stick, a flash drive, or an external hard disc drive, as illustrative examples, or any other suitable data storage technology.

Computer-readable medium 102 may include any type of optical, magnetic, or other physical medium that physically encodes program code 104 as a binary series of different physical states in each unit of memory that, when read by computing device 80, induces a physical signal that is read by processor 84 that corresponds to the physical states of the basic data storage elements of storage medium 102, and that induces corresponding changes in the physical state of processor unit 84. That physical program code signal may be modeled or conceptualized as computer-readable instructions at any of various levels of abstraction, such as a high-level programming language, assembly language, or machine language, but ultimately constitutes a series of physical electrical and/or magnetic interactions that physically induce a change in the physical state of processor unit 84, thereby physically causing processor unit 84 to generate physical outputs that correspond to the computer-executable instructions, in a way that causes computing device 80 to physically assume new capabilities that it did not have until its physical state was changed by loading the executable instructions comprised in program code 104.

In some illustrative examples, program code 104 may be downloaded over a network to data storage 96 from another device or computer system for use within computing device 80. Program code 104 comprising computer-executable instructions may be communicated or transferred to computing device 80 from computer-readable medium 102 through a hard-line or wireless communications link to communications unit 90 and/or through a connection to input/output unit 92. Computer-readable medium 102 comprising program code 104 may be located at a separate or remote location from computing device 80, and may be located anywhere, including at any remote geographical location anywhere in the world, and may relay program code 104 to computing device 80 over any type of one or more communication links, such as the Internet and/or other packet data networks. The program code 104 may be transmitted over a wireless Internet connection, or over a shorter-range direct wireless connection such as wireless LAN, Bluetooth™, Wi-Fi™, or an infrared connection, for example. Any other wireless or remote communication protocol may also be used in other implementations.

The communications link and/or the connection may include wired and/or wireless connections in various illustrative examples, and program code 104 may be transmitted from a source computer-readable medium 102 over non-tangible media, such as communications links or wireless transmissions containing the program code 104. Program code 104 may be more or less temporarily or durably stored on any number of intermediate tangible, physical computer-readable devices and media, such as any number of physical buffers, caches, main memory, or data storage components of servers, gateways, network nodes, mobility management entities, or other network assets, en route from its original source medium to computing device 80.

As will be appreciated by one skilled in the art, aspects of the present invention may be embodied as a method, a device, a system, or a computer program product, for example. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable data storage devices or computer-readable data storage components that include computer-readable medium(s) having computer readable program code embodied thereon. For example, a computer-readable data storage device may be embodied as a tangible device that may include a tangible, non-transitory data storage medium, as well as a controller configured for receiving instructions from a resource such as a central processing unit (CPU) to retrieve information stored at one or more particular addresses in the tangible, non-transitory data storage medium, and for retrieving and providing the information stored at those particular one or more addresses in the data storage medium.

The data storage device may store information that encodes both instructions and data, for example, and may retrieve and communicate information encoding instructions and/or data to other resources such as a CPU, for example. The data storage device may take the form of a main memory component such as a hard disc drive or a flash drive in various embodiments, for example. The data storage device may also take the form of another memory component such as a RAM integrated circuit or a buffer or a local cache in any of a variety of forms, in various embodiments. This may include a cache integrated with a controller, a cache integrated with a graphics processing unit (GPU), a cache integrated with a system bus, a cache integrated with a multi-chip die, a cache integrated within a CPU, or the processor registers within a CPU, as various illustrative examples. The data storage apparatus or data storage system may also take a distributed form such as a redundant array of independent discs (RAID) system or a cloud-based data storage service, and still be considered to be a data storage component or data storage system as a part of or a component of an embodiment of a system of the present disclosure, in various embodiments.

Any combination of one or more computer readable medium(s) may be utilized. The computer readable medium may be a computer readable signal medium or a computer readable storage medium. A computer readable storage medium may be, for example, but is not limited to, an electronic, magnetic, optical, electromagnetic, infrared, electro-optic, heat-assisted magnetic, or semiconductor system, apparatus, or device, or any suitable combination of the foregoing. A non-exhaustive list of additional specific examples of a computer readable storage medium includes the following: an electrical connection having one or more wires, a portable computer diskette, a hard disc, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device, for example.

Program code embodied on a computer readable medium may be transmitted using any appropriate medium, including but not limited to radio frequency (RF) or other wireless, wireline, optical fiber cable, etc., or any suitable combination of the foregoing. Computer program code for carrying out operations for aspects of the present invention may be written in any combination of one or more programming languages, including an object oriented programming language such as Java, Smalltalk, C++, Objective-C, or the like, or other imperative programming languages such as C, or functional languages such as Common Lisp, Haskell, or Clojure, or multi-paradigm languages such as C#, Python, Ruby, or Scala, among a variety of illustrative examples. One or more sets of applicable program code may execute partly or entirely on the user's desktop or laptop computer, smartphone, tablet, or other computing device; as a stand-alone software package, partly on the user's computing device and partly on a remote computing device; or entirely on one or more remote servers or other computing devices, among various examples. In the latter scenario, the remote computing device may be connected to the user's computing device through any type of network, including a local area network (LAN) or a wide area network (WAN), or the connection may be made to an external computer (for example, through a public network such as the Internet using an Internet Service Provider), and for which a virtual private network (VPN) may also optionally be used.

In various illustrative embodiments, various computer programs, software applications, modules, or other software elements may be executed in connection with one or more user interfaces being executed on a client computing device, that may also interact with one or more web server applications that may be running on one or more servers or other separate computing devices and may be executing or accessing other computer programs, software applications, modules, databases, data stores, or other software elements or data structures. A graphical user interface may be executed on a client computing device and may access applications from the one or more web server applications, for example. Various content within a browser or dedicated application graphical user interface may be rendered or executed in or in association with the web browser using any combination of any release version of HTML, CSS, JavaScript, XML, AJAX, JSON, and various other languages or technologies. Other content may be provided by computer programs, software applications, modules, or other elements executed on the one or more web servers and written in any programming language and/or using or accessing any computer programs, software elements, data structures, or technologies, in various illustrative embodiments.

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, may create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices, to produce a computer implemented process such that the instructions which execute on the computer or other programmable apparatus provide or embody processes for implementing the functions or acts specified in the flowchart and/or block diagram block or blocks.

The flowchart and block diagrams in the figures illustrate the architecture, functionality, and operation of possible implementations of devices, methods and computer program products according to various embodiments of the present disclosure. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may be executed in a different order, or the functions in different blocks may be processed in different but parallel threads, depending upon the functionality involved. Each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The description of the present disclosure has been presented for purposes of illustration and description, and is not intended to be exhaustive or limited to the disclosure in the form disclosed. Many modifications and variations will be understood by those of ordinary skill in the art based on the concepts disclosed herein. The particular examples described were chosen and disclosed in order to explain the principles of the disclosure and example practical applications, and to enable others of ordinary skill in the art to understand the disclosure for various embodiments with various modifications as are suited to the particular use contemplated. The various examples described herein and other embodiments are within the scope of the following claims.

What is claimed is:

1. A method, performed by one or more processors, comprising:

receiving information on a user role of a user account associated with a business intelligence system;

gathering information on interactions of the user account with the business intelligence system, wherein gathering the information on the interactions of the user account with the business intelligence system comprises recording one or more interactions the user account has with each of one or more levels of detail in a multidimensional data source associated with the business intelligence system;

generating an initial business intelligence output based on data from one or more data sources;

determining weightings of associations between the user account and the one or more levels of detail in the multidimensional data source based on the one or more interactions the user account has with each of one or more levels of detail in the initial business intelligence output;

generating a customized business intelligence output for the user account in one or more subsequent business intelligence outputs based on the initial business intelligence output, the user role, and the weightings of associations between the user account and the one or more levels of detail in the multidimensional data source based on the one or more interactions the user account has with each of one or more levels of detail in the initial business intelligence output; and providing the customized business intelligence output to the user account in the one or more subsequent business intelligence outputs, wherein providing the customized business intelligence output to the user account comprises presenting search results for a search of the customized business intelligence output that are ranked or filtered based at least in part on the weightings of associations between the user account and the one or more levels of detail in the multidimensional data source based on the one or more interactions the user account has with each of one or more levels of detail in the initial business intelligence output.

2. The method of claim 1, wherein the user account is a first user account among a plurality of additional user accounts associated with the business intelligence system, the method further comprising:

receiving information on user roles of the additional user accounts;

gathering information on interactions of the additional user accounts with the business intelligence system;

generating additional customized business intelligence outputs for the additional user accounts based on the initial business intelligence output, the user roles, and the interactions of the additional user accounts with the business intelligence system; and providing the additional customized business intelligence outputs to the additional user accounts.

3. The method of claim 1, wherein generating the customized business intelligence output for the user account comprises presenting an initial view of information from a multidimensional data source at a level of detail selected based on the user role and the interactions of the user account with the business intelligence system.

4. The method of claim 1, wherein generating the customized business intelligence output for the user account comprises indicating one or more recommendations for specific information in the customized business intelligence output based on the user role and the interactions of the user account with the business intelligence system.

5. The method of claim 1, wherein generating the customized business intelligence output for the user account comprises providing customized report prompts in the customized business intelligence output based on the user role and the interactions of the user account with the business intelligence system.

6. The method of claim 1, wherein providing the customized business intelligence output for the user account comprises emailing the customized business intelligence output to an email address associated with the user account.

7. The method of claim 1, wherein providing the customized business intelligence output for the user account comprises providing the customized business intelligence output to a dashboard associated with the user account.

8. The method of claim 1, wherein providing the customized business intelligence output for the user account comprises presenting the search results for the search of the business intelligence output that are further ranked or filtered based at least in part on the user role.

9. The method of claim 1, wherein generating the customized business intelligence output for the user account in the one or more subsequent business intelligence outputs based on the initial business intelligence output, the user role, and the weightings of associations between the user account and the one or more levels of detail in the multidimensional data source comprises ranking the one or more levels of detail based on user interactions with a BI output beyond a default view focused on a primary level for the user account.

10. The method of claim 1, wherein gathering the information on the interactions of the user account with the business intelligence system comprises creating associations between the user account and interactions of the user account through authoring or analysis tools with one or more levels of detail in the multidimensional data source.

11. The method of claim 1, wherein gathering the information on the interactions of the user account with the business intelligence system comprises creating associations between the user account and interactions of the user account with one or more hierarchical filters with one or more levels of detail in the multidimensional data source.

12. The method of claim 1, wherein gathering the information on the interactions of the user account with the business intelligence system comprises creating associations between the user account and interactions of the user account with one or more slicer controls with one or more levels of detail in the multidimensional data source.

13. The method of claim 1, further comprising modifying the weightings of associations between the user account and the one or more levels of detail of the interactions of the user account with multiple dimensions of the multidimensional data source over time based on interactions the user account has with each of one or more levels of detail in the one or more BI outputs over time.

* * * * *